United States Patent Office 2,719,804
Patented Oct. 4, 1955

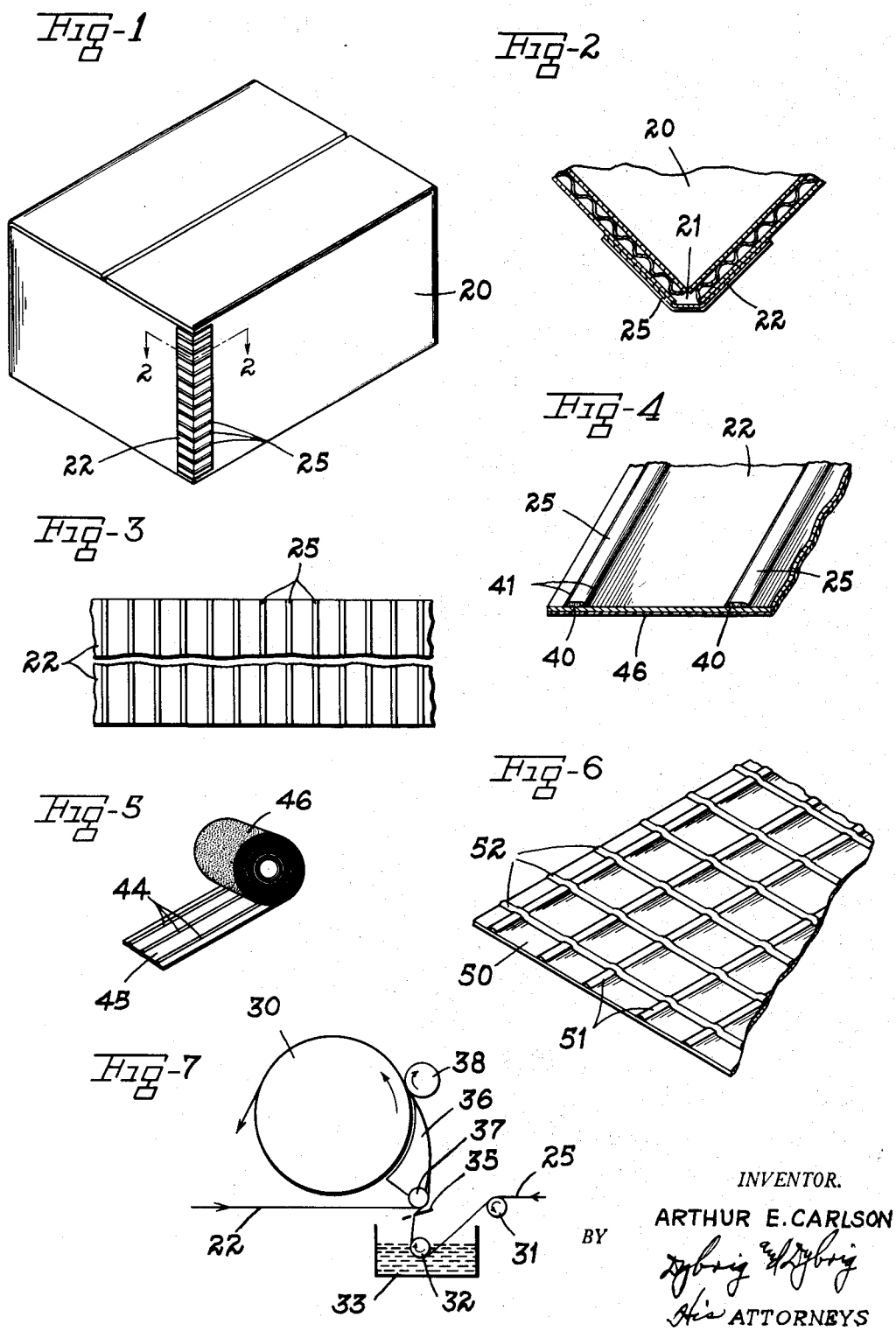
Oct. 4, 1955
A. E. CARLSON
2,719,804
REINFORCED SHEET MATERIAL AND METHOD OF PRODUCING THE SAME
Filed March 16, 1951
2 Sheets-Sheet 1
INVENTOR.
ARTHUR E. CARLSON
BY
ATTORNEYS

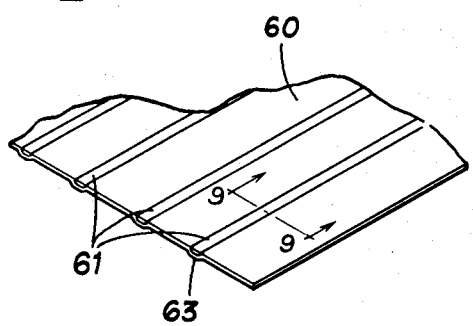
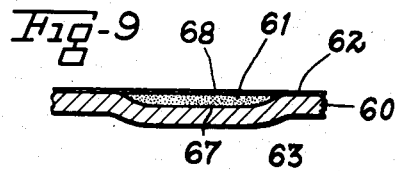
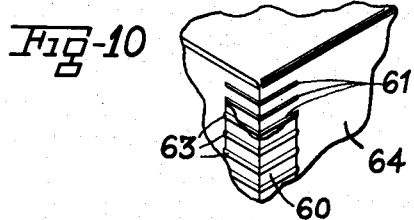
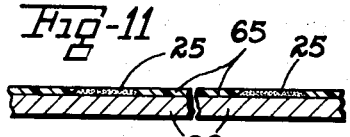
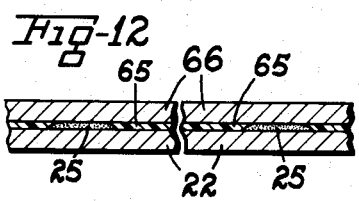
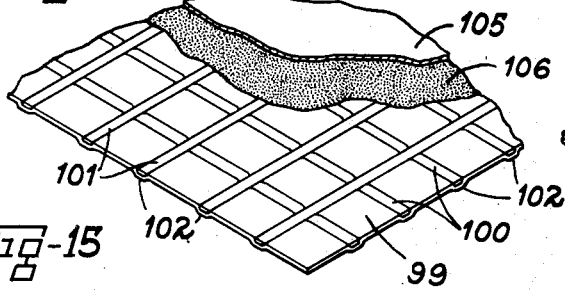
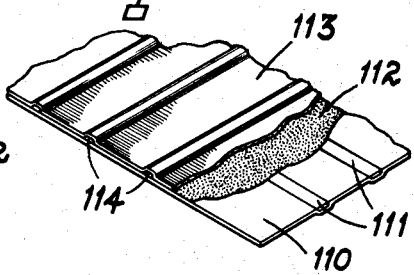
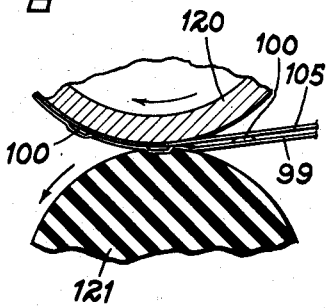
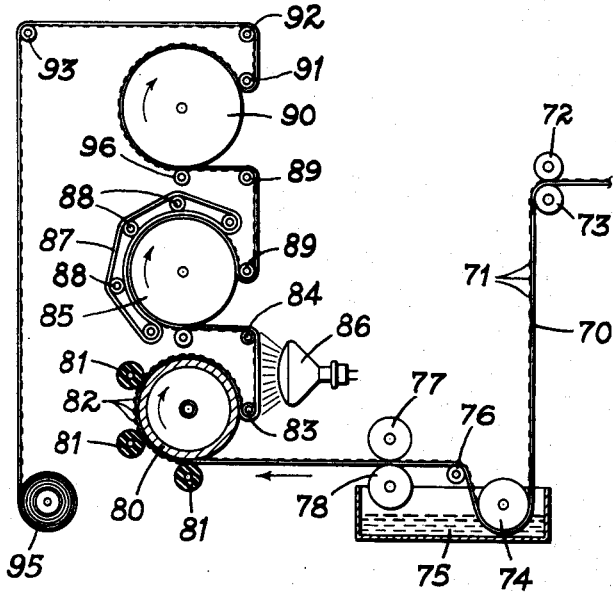

2,719,804

REINFORCED SHEET MATERIAL AND METHOD OF PRODUCING THE SAME

Arthur E. Carlson, Troy, Ohio

Application March 16, 1951, Serial No. 216,054

13 Claims. (Cl. 154—93)

This invention relates to reinforced paper products such as stay tape and the like, and to methods and apparatus for producing the same. This application is a contiuation-in-part of my applications Serial No. 109,482 filed August 10, 1949, now Patent Number 2,610,936, and Serial No. 140,532 filed January 25, 1950, now abandoned.

The invention has particular relation to the production of stay tape such as is used in the fabrication of cartons of corrugated paperboard and for like sealing purposes wherein the tape may be subjected to considerable stress in use. For example, the stay tapes applied to the so-called manufacturer's joint along the abutting edges of the side panels of a carton blank to hold the blank together in forming the carton are subjected both to tensile stress, against the bursting forces from the load of the contents within the carton, and also to shear stress tending to rip or shear the tape along the joint. Accordingly, it is desirable that stay tape for such purposes possess adequate strength to resist both of these types of stress.

Among forms of reinforced tape currently in wide use is a laminated paper tape having an internal layer of asphaltic adhesive in which are embedded a multiplicity of sisal fibers. This form of tape has reasonably good tensile strength at relatively low temperatures at which the asphalt is firm, but at room temperatures the asphalt softens and tends to permit the fibers to slip therein under tensile stress instead of reinforcing the tape, and the resulting decrease in tensile strength increases at higher temperatures. Conversely, the asphalt-sisal tape has quite satisfactory shear strength at room temperature, because a tearing action on the tape causes the fibers to slip through the asphalt and group together in mutually reinforcing relation, but when the asphalt is cold and hard, the fibers remain individually in place and are more easily ruptured as a tearing action proceeds across the tape. Furthermore, at high temperatures the fibers slip too easily through the asphalt with resulting reduction in the shear strength.

Another widely used form of reinforced stap tape includes a paper web having a layer of loosely woven cloth bonded to the outer surface thereof. In application on a carton, this construction has a lower resistance to transverse tensile stresses than is theoretically available, owing to the fact that the cloth reinforcement is considerably more stretchable than the paper layer, and thus a bursting force tends first to rupture the paper while merely stretching the cloth, leaving only the adhesive bond between the cloth and paper to hold the joint. The adhesion of the cloth to the paper is largely along a series of primarily line contacts between the individual threads and the surface of the paper, and because the stretch in the cloth is greater than the stretch of the adhesive bonding it to the paper, a progressive failure in the adhesive bond between the cloth and paper takes place. This construction, therefore, does not provide a usable strength that is substantially equal to the sum of the strengths of the materials involved.

Another characteristic of both of these types of reinforced tape in use is that when the tape is subjected to a stress tending to remove it from a carton or other article, the usual result is for the tape to split, with the split occurring in the paper layer of the cloth backed tape and in the inner paper layer of the asphalt-sisal lamination. Thus in both cases, the splitting has the effect of entirely removing the reinforcing material and leaving at best only a thin paper film adjacent the layer of adhesive by which the tape was initially applied to the carton or the article.

The present invention has among its primary objectives the provision of a reinforced paper web suitable for use as stay tape which possesses improved tensile strength and shear strength over the full range of temperatures under which it is likely to be used as contrasted with products heretofore available for this purpose, and particularly as compared with both the asphalt-sisal and cloth backed types of tape discussed, which effectively eliminates the splitting tendencies of the other forms of reinforced tape commonly used, and which at the same time is simple and economical to produce and to use.

The above noted Patent No. 2,610,936 describes an improved stay tape comprising a single web of strong paper of the kraft type having a plurality of elongate reinforcing elements overlying one surface of the web in spaced relation, each of the reinforcing elements consisting essentially of a multiplicity of fine substantially continuous and substantially untwisted organic synthetic filaments arranged in close side by side and overlying relation to form a thin band in combination with adhesive material substantially saturating each band and securing the filaments therein to each other and to the web surface in compact form, and with each band being of substantially greater width than the maximum thickness thereof to provide a correspondingly wide area for intimate adhesive contact between the band and the web surface.

For example, highly satisfactory results have been obtained with reinforced stay tape as outlined above wherein the reinforcing bands are formed of a zero twist rayon yarn and with these bands bonded to a kraft paper web by means of a non-asphaltic adhesive such as a synthetic resin or a latex-base adhesive. These reinforcing bands may be arranged either longitudinally of the tape or transversely, with the latter arrangement being generally particularly desirable for the purposes of stay tape since it provides the maximum reinforcement in the direction of minimum natural strength in the paper web wherein reinforcement is especially desired in stay tape.

This reinforced tape may be applied to cartons or other articles with the reinforcing bands or elements thereon either facing the article or exposed as desired. Since the reinforcing bands are readily applied in evenly spaced relation, they do not detract from the appearance of the reinforced article, and further since they are relatively thin, there is little danger of their displacement or other damage by abrasion, in which respect they are further protected by saturation thereof by the adhesive employed to bond them to the web. At the same time, a cover sheet of paper may be laminated over the reinforced surface of the web if desired and in both cases, the strong adhesive relation of the reinforcing bands to the paper materially enhances both the tensile strength and the shear strength of the tape as a whole, with the individual filaments in each band mutually reinforcing each other.

The thinness of the reinforcing bands on the tape also makes it readily possible to bond the tape in place on a carton or other article by means of a layer of adhesive applied on the same surface of the web as the bands. This result is facilitated in accordance with the invention by subjecting the reinforced web to the application of controlled pressure to embed or deboss the reinforcing bands into the paper so that the outer surfaces of the bands are substantially coplanar with the web surfaces between adjacent bands. This arrangement provides the further advantage that if the paper layer should be split so that even the major portion is removed, the reinforcing elements will remain in place instead of splitting off with the paper as with the above types of reinforced tape in common use.

It is accordingly one of the principal objects of the present invention to provide a method of fabricating reinforced paper products of the above type in which the reinforcing bands for the paper web are first saturated with adhesive and are then applied to the surface of the paper with sufficient pressure to maintain the width of each band substantially greater than the maximum thickness thereof for intimate adhesive contact between each saturated band and the web surface, and particularly to provide such a method wherein each of the reinforcing bands comprises a multiplicity of fine substantially continuous filaments arranged in sufficiently untwisted relation for ready lateral displacement under pressure so that when pressure is applied thereto, the individual filaments are caused to spread laterally and thus to increase the width of each band for intimate adhesive contact thereof with the web surface.

Another object of the invention is to provide a method of fabricating reinforced paper products of the above type in which the reinforcing bands bonded to a web of strong paper, such as kraft or the like, are embedded or debossed in the paper by a controlled pressure operation causing the paper to be molded around the individual bands without substantially changing the overall dimensions of the paper, and particularly without undesirably affecting the strength of the paper along each reinforcing band, and thereby to produce reinforced paper products wherein the reinforcing bands lie with their exposed surfaces in substantially coplanar relation with the surface portions of the paper web between adjacent bands.

An additional object is to provide a method of fabricating reinforced paper products in which reinforcing bands bonded to one supporting web of paper as described are covered with a further layer of paper bonded to the reinforced web, and in which this lamination is then subjected to a controlled pressure operation causing the reinforcing bands to be embedded or debossed in one paper layer while the other paper layer is maintained with its outer surface effectively smooth.

It is also an object of the invention to provide a reinforced paper product adapted for uses such as in stay tape which comprises a layer of paper having a multiplicity of flat, ribbon-like reinforcing elements bonded to one surface thereof and embedded or debossed therein to give a substantially uniformly smooth surface to the reinforced side of the web, and particularly to provide such a product wherein the reinforcing elements are saturated with and bonded to the paper by an adhesive which is moldable under pressure to give improved flexibility to the finished paper as well as to facilitate the embedding or debossing operation in the formation thereof.

Still another object of the invention is to provide apparatus for carrying out the above methods, and particularly for effecting the desired controlled pressure operation and associated treatment on the reinforced paper products to embed or deboss the reinforcing elements with respect to the paper layer.

Additional objects and advantages of the invention will be apparent from the following description, the accompanying drawings and the appended claims.

In the drawings—

Fig. 1 is a perspective view of a carton formed by means of reinforced stay tape in accordance with the present invention;

Fig. 2 is an enlarged fragmentary section on the line 2—2 of Fig. 1;

Fig. 3 is a plan view of a section of the stay tape formed in accordance with the invention and with the reinforcing elements arranged transversely thereon;

Fig. 4 is an enlarged view in perspective of a fragment of the tape of Fig. 3;

Fig. 5 is a perspective view of a roll of stay tape in accordance with the invention having the reinforcing elements arranged longitudinally thereon;

Fig. 6 is a fragmentary view in perspective of a reinforced paper product in accordance with the invention in which the reinforcing elements are arranged both longitudinally and transversely;

Fig. 7 is a diagrammatic view showing a method and apparatus for fabricating the reinforced paper products of Figs. 1 to 6;

Fig. 8 is a fragmentary perspective view of a reinforced paper web in accordance with the invention having the reinforcing elements embedded or debossed therein;

Fig. 9 is an enlarged fragmentary section on the line 9—9 of Fig. 8;

Fig. 10 is a fragmentary perspective view of a corner of a carton formed by means of stay tape constructed as shown in Fig. 8 and with the tape adhered to the carton with the reinforcing elements next to the carton;

Figs. 11 and 12 are views similar to Fig. 9 showing other forms of reinforced paper webs in accordance with the invention.

Fig. 13 is a fragmentary perspective view, partly broken away, showing a reinforced and laminated paper product in accordance with the invention and with the reinforcing elements adhered to and embedded in one of the paper layers;

Fig. 14 is a fragmentary perspective view of another form of reinforced and laminated product in accordance with the invention;

Fig. 15 is a somewhat diagrammatic view of apparatus for forming the products of the invention; and Fig. 16 is an enlarged fragmentary and somewhat diagrammatic view further illustrating apparatus for fabricating the products of the invention.

Referring to the drawings, which illustrate preferred embodiments of the present invention, Figs. 1 and 2 show a typical carton 20 formed of a corrugated paperboard blank having the edges thereof joined at 21 by means of a strip 22 of reinforced stay tape, this construction being known commercially as a manufacturer's joint and being readily fabricated by means of high speed taping machines. For such applications, the stay tape 22 is commonly provided from a supply roll of substantial capacity, and since such a roll is usually formed from a paper web extending longitudinally of its direction of formation on the paper machine, it normally possesses substantially less tensile strength transversely thereof than longitudinally. However, since the major stresses on the tape in place on the carton are transversely of its length, the tape is provided in accordance with the invention with a multiplicity of reinforcing elements 25 extending transversely across it as shown.

Figs. 3 and 4 illustrate in detail a stay tape in accordance with the invention for uses such as on a carton as shown in Figs. 1 and 2. The web 22 which forms the main body of the tape is preferably a strong paper such as kraft or similar paper hardened and strengthened by the incorporation of adhesive sizing, such paper being identified generally herein as of the kraft type and satisfactory results having been obtained with kraft paper ranging from 60 to 80 pounds per ream. Each of the reinforcing elements 25 is a narrow band or ribbon arranged in spaced and substantially parallel relation with the adjacent bands 25 along one surface of the web 22 and strongly bonded thereto, and the bands 25 extend transversely of the length of the web to reinforce it in the direction in which it is subjected to the maximum stress in use on a carton.

For preferred results in the practice of the invention, the individual reinforcing elements or bands 25 should be thin and substantially flat, with the width of each band substantially greater than its average thickness so that it can lie flat on the surface of the web while presenting a relatively broad surface for adhesion to the paper. It is especially desirable in the case of stay tape that the reinforcing bands combine with the paper web and the adhesive by which they are secured to the web in such manner that the three act in unison, and particularly that they fail substantially in unison under tensile stress as contrasted with the undesirable result noted above in the case of the cloth backed tape, wherein the paper tends to rupture while the reinforcement merely stretches. Also, it is important for the purposes of the invention that the bands be composed at least primarily of continuous filaments, since such filaments do not require twisting to hold them together lengthwise, and when the bands are thus substantially untwisted, they are more readily flattened on the web and also they are more readily permeated by the adhesive for bonding them to the web.

Satisfactory results from these several standpoints have been obtained utilizing zero twist rayon yarn, which consists of many hundreds of fine, substantially continuous organic synthetic filaments grouped in sufficiently untwisted relation for ready lateral displacement under pressure. For example, a material found suitable for use on stay tape is a 1650 denier zero twist rayon yarn, which is approximately 0.0625 inch wide and only about 0.0035 inch in thickness and which contains on the order of one thousand individual filaments. Other low twist synthetic materials have been used successfully. A finer denier yarn, for example a cellulose acetate "Fortisan" yarn of approximately 800 denier having one-half turn of twist per inch, has also been used successfully, as well as heavier yarns such for example as a zero twist rayon yarn of 2200 denier, which is approximately 0.090 inch wide and 0.0045 inch in thickness.

As shown in Fig. 3, the several bands 25 are arranged in substantially parallel and spaced relation along the paper web, satisfactory results in the above example having been obtained with the individual bands spaced three or four to the inch lengthwise of the tape, or closer when finer yarns are used. Also, in fabricating the tape, preferred results from the standpoint of strength have been obtained if the individual bands or ribbons are saturated with the adhesive employed to bond them to the paper web. When this is done, the individual filaments are bonded together in the band so that they mutually reinforce each other against a tearing force, and also they are intimately bonded to the paper to aggregate their strength with that of the web itself.

Preferred results are obtained in accordance with the invention when the adhesive and the filaments act together as integral parts of the reinforcing elements, and several properties of the adhesive are important in obtaining such results. Thus the adhesive is preferably as hard as possible over the entire temperature range of normal use while still being capable of being molded under pressure and of retaining its molded shape, and sufficient pliability to prevent undesired stiffness in the product. Also it should have a strong adhesive grab for the paper webs used for the purposes of the invention, as well as for the reinforcing elements and should be selected accordingly depending in part upon whether organic or inorganic filaments are used therein. Satisfactory results meeting these conditions have been obtained with non-asphaltic waterproof adhesives such as synthetic resin or latex-base adhesives, one example of a suitable such adhesive being the Polyblend Latex adhesive sold by B. F. Goodrich Company in water dispersion form under the designation No. 550–20. Other adhesives such as thermoplastic adhesives and solvent-activated resin adhesives may also be used.

Fig. 7 shows diagrammatically a method and apparatus for applying the reinforcing bands 25 to the paper web 22 in conjunction with a large roller or drum 30. The bands 25 of yarn are fed from a suitable supply source over a guide roller 31 and around a roller 32 immersed in a tank 33 of the liquid adhesive. It is not necessary to prolong the application of the adhesive, since with the ribbon or band of the type described, the adhesive is readily taken up by capillary action throughout the entire band of yarn in sufficient quantity for saturation.

It is desirable to flatten the bands before they are applied to the web, and this may be done by passing the yarn through a doctor member shown diagrammatically at 35 and formed with a slit for simultaneously flattening the yarn and metering off excessive adhesive. The desired flatness is readily maintained if the bands are applied to the web at a position as close as possible to the doctor. This result is aided by the provision of a guide form 36 having a curved surface over which the web and bands travel together before reaching the surface of the drum 30. A guide roller 37 may be provided as shown over which the web travels to the guide form, with the actual application of the yarn to the web taking place as the two travel over roller 37.

With this arrangement as shown, wherein the yarn travels tangentially towards the roller 37 and the guide form, and also with the web and bands traveling over the curved surface of the guide form and the curved drum, sufficient tension is applied to the bands to assert moderate pressure thereon urging them into even contact with the web and also assuring complete saturation of each band with adhesive by forcing the adhesive into all spaces between individual filaments. Additional pressure may be applied by a roller 38 pressing with moderate pressure against the drum at a position slightly beyond the point of contact of the web with the drum after it leaves the guide form. The drum may be heated to accelerate setting of the adhesive, and it is desirable of the dimensions of the drum and the time of travel thereon of any given section of the web are correlated to assure adequate setting of the adhesive, and it is desirable if the dimensions of the drum surface.

The method of applying the reinforcing bands illustrated in Fig. 7 effects the desired saturation of the bands by the adhesive, but the same result may be obtained in other ways. For example, if a thermoplastic adhesive is used, the reinforcing bands may be separately prepared by applying the adhesive thereto and then permitting it to set. Thereafter when the bands are applied to the paper, either or both may be heated to render the adhesive sufficiently tacky for proper adhesion to the paper, as by maintaining the drum 30 in Fig. 7 sufficiently hot for this purpose. Similar results may be obtained by separate preparatory treatment of the bands with an adhesive capable of subsequent activation by a suitable solvent when the bands are applied to the web.

When the reinforcing bands are applied as described, they assume the general configuration shown in enlarged detail in Fig. 4, with the surface 40 thereof adjacent the web flattened into intimate adhesive contact with the web, but with the outer surface somewhat rounded at least along its side edges as indicated at 41. It will be appreciated that the dimensions in Fig. 4 are considerably exaggerated for clarity of illustration, actual typical dimensions being as mentioned above, and these dimensions may be readily varied as desired by controlling the pressure against the bands on the web prior to setting of the adhesive. With the adhesive saturating the band as described, all of the component filaments therein are intimately bonded together and to the paper web to maintain the band in compact form having minimum projection above the plane of the web surface, and at the same time with the width of the band many times greater than its thickness, there is a correspondingly wide area for intimate adhesion between each band and the paper web. Also, the rounded outer surface shape of the bands is an advantage when the tape is applied to a carton as shown in Figs. 1 and 2 with its reinforced surface outermost, since this surface configuration minimizes damage to the individual bands by abrasive contact therewith in use.

The method and apparatus illustrated in Fig. 7 are especially adapted for applying the reinforcing bands longitudinally to the paper web, to give a reinforced tape as shown in Fig. 5 wherein the bands 44 extend lengthwise of the paper web 45. It will be apparent, however, that since the web 22 in Fig. 7 may be of substantial width, it would be readily possible to cut therefrom strips of tape as shown in Figs. 1 and 3 having the reinforcing bands arranged transversely, and apparatus especially designed to apply the reinforcing bands transversely to a continuously advancing paper web is shown in my copending application Serial No. 178,434 filed August 9, 1950, and also in my copending joint application with Joseph Baxter, Jr., Serial No. 179,302 filed August 14, 1950. With both types of arrangements, adhesive may be applied to either side of the tape by means of a suitable conventional coating apparatus, a coating 46 of adhesive being shown as applied to the surface of the tape opposite the reinforcing bands in Figs. 4 and 5.

It is also practicable in accordance with the invention to apply the reinforcing bands to a paper web at substantially right angles to each other to provide a mesh-like reinforcing structure. Such an arrangement is shown in Fig. 6, wherein the paper web 50 has one set of reinforcing bands 51 bonded thereon and spaced in substantially parallel relation, and a second plurality of similar reinforcing bands 52 is bonded thereon with the bands 52 arranged at substantially right angles to the bands 51. When the individual bands are formed as described above from a low twist yarn of continuous filaments, the several bands lie sufficiently flat on the surface of the paper web so that even where there is a double thickness at the point at which two bands cross each other, the total projection above the plane of the paper surface is not objectionable, and the composite product is materially stronger with respect to both tensile strength and shear strength than reinforced papers of the conventional types as well as economical to produce.

It has been found desirable when using the reinforced sheet material of the invention as stay tape to apply the tape with the reinforcing bands on the gummed side of the tape so that they lie adjacent the surface of the carton or other article, and it is also desirable that the gummed surface be substantially smooth for optimum results. These objectives are obtained in accordance with the invention by subjecting the reinforced web to a controlled pressure operation causing the reinforcing bands or strips to be embedded or debossed into the web, preferably to such extent that their exposed surfaces are substantially flush or coplanar with the portions of the web surface between adjacent bands. Figs. 8 and 9 show in detail fragments of a stay tape or other reinforced paper web 60 having spaced and substantially parallel reinforcing bands 61 bonded thereto and embedded therein. It will be noted particularly in Fig. 9 that with the paper thus formed at least partially around the side edges of the reinforcing bands, the reinforced surface of the web is substantially smooth so that a layer 62 of adhesive of normal commercial thickness may be applied thereto and will be of substantially uniform thickness on both the bands and the areas of paper between bands, while the back or reverse side of the paper has ribs 63 formed therein to receive the reinforcing bands as shown.

The debossed stay tape as shown in Figs. 8 and 9 offers improved shear resistance in that it is practicable to employ reinforcing bands therein of somewhat greater thickness than when the bands lie on a flat web surface as in Figs. 3 and 4. Thus for a yarn of given denier and filament content, if the band is not debossed it should ordinarily be spread somewhat flatter on the web surface, and hence it will be thinner and more easily ruptured by progressive tearing of the filaments than a debossed band of the same yarn, which may have its thickness somewhat greater and its width correspondingly less.

This debossed construction of stay tape has special advantages when applied to a carton 64 as shown in Fig. 10 with the reinforcing bands adjacent the surface of the carton and thus covered by the paper web, smooth and substantially uniform adhesion to the carton being obtained. Also the layer of paper protects the reinforcing elements, and at the same time the evenly spaced ribs on its exposed surface do not detract from its appearance. A particular advantage of this construction of tape is manifested in the event of a stress of the type usually causing splitting of the asphalt-sisal or cloth backed tapes as discussed above. Instead of having the effect of removing the reinforcing elements as in the case of other tapes, splitting of the paper layer in the tape of the present invention will occur externally of the reinforcing bands, leaving the latter still adhered to the carton as indicated at the upper part of Fig. 10 and thus the major portion of the effective strength of the joint substantially unimpaired.

Another advantage of the stay tape of the invention which is especially noticeable in use on cartons is the improved characteristics of tensile strength in relation to width and as compared with prior reinforced tapes. Thus when a two-inch strip of the tape of the invention is adhered evenly to two separate sections of corrugated board forming a joint and is subjected to tensile stress, the adhesive grab of the reinforcing bands for both the web and the board is so strong that the tape will break at the joint without separation of the bands. In contrast, when a two-inch strip of asphalt-sisal tape is subjected to the same test at room temperature, the sisal fibers tend to pull out of the adhesive as the paper breaks. Comparable test results with the asphalt-sisal tape require a three-inch tape, illustrating the substantial difference in tensile strength between the two tapes, and it will thus be seen that in the tape of the invention, the adhesive grab between each reinforcing band and the web is stronger in as little as one inch of length of the band than the tensile strength of the band itself, apparently as a result of the comparatively wide and flat shape of the band and the integral bonding together of its component fibers, which also combine to effect the above described result of retaining the bands on a carton when the paper is split away.

It is also practicable for some uses of the reinforcing tapes of the invention, particularly for applications thereof wherein the tape is subjected to substantial shear stress, to provide adhesive on the reinforced surface of the tape only in the areas between the reinforcing bands and with little or no adhesive overlying the bands themselves. For example, the tape may be gummed by a discontinuous applicator having gaps therein aligned with the reinforcing bands or by employing an adhesive in the layer 62 which does not readily adhere to the reinforcing bands. When the tape is formed as shown in Fig. 4 with the bands projecting slightly above the plane of the paper, the gumming may be carried out by passing the tape between rolls with sufficient pressure to force the adhesive off of the bands while it is applied in the intermediate spaces on the web.

In the latter case with well flattened bands, the proper or normal amount of adhesive will form a layer of sufficient thickness to give a substantially smooth surface to the tape as a whole as shown in Fig. 11, wherein the adhesive 65 is applied to paper web 22 between the reinforcing bands 25 formed as described of organic or inorganic substantially continuous filaments. A similar arrangement may be employed in a laminated reinforced product as shown in Fig. 12 wherein a covering web 66 is bonded to the reinforced web 22 by means of the adhesive layer 65 which also serves to fill the spaces between adjacent bands and thus to give substantially uniform thickness to the laminated product. For such uses, the adhesive 65 may be the same material employed to bond the bands 25 to web 22, in which case it may be applied to the entire surface of web 22 in conjunction with the bands 25, or it may be a different material such, for example, as an asphalt, in which case it would be applied after the reinforcing bands.

When tape formed as described with an effective adhesive coating only between the reinforcing bands is in use on an article and is subjected to shearing stress, since the bands are not firmly adhered to the article, a tearing force striking a band will raise it away from the article until its width is substantially perpendicular to the article, thus causing all the filaments therein to provide the maximum combined resistance to the tear, instead of permitting successive tearing of the individual filaments as might happen if all were firmly adhered to the surface of the carton or if they were enclosed within a laminated cover sheet. This desired characteristic of increased tear resistance is present with all the stay tapes of the invention when such tape is applied to a carton as described, since the usual arrangement leaves a space between the outer edges of the blank, as shown at 21 in Fig. 2, which assures that the bands across the joint will remain unadhered to the carton and thus free to reinforce each other against tearing as described.

In fabricating the product shown in Figs. 8 and 9, the reinforcing bands or ribbons may initially be of the same character as described in connection with Figs. 1 to 4 and may be applied to the web in any of the several ways described. The embedding or debossing operation may be carried out as the reinforcing bands are applied to the web, but preferred results are obtained if the adhesive for the bands is first allowed to set at least partially, especially when a pressure moldable adhesive is used, in order to cause the bands to assume a fairly definite shape and to prevent the filaments therein from spreading too far laterally on the web. The debossing operation is then readily carried out by applying pressure to the reinforced side of the web while yieldably supporting the reverse side of the web, for example by passing the web between a hard steel roll and a yieldable rubber roll with the reinforced side of the web adjacent the steel roll.

In performing this operation, preferred results are obtained when the yieldably surfaced roll is as hard as possible while still of sufficient elasticity to return to its former shape after repeated deformation by the reinforcing bands passing between the two rolls, in order to assure that a firm grip is maintained on the web as it passes through the nip of the rolls causing permanent deformation of the hard kraft paper and not a mere temporary flexing. What is desired is effectively a molding of the paper around the reinforcing bands, and also a molding or reversal of shape of the reinforcing bands themselves so that their exposed surfaces which were more or less rounded are pressed flat while their previously relatively flat unexposed surfaces are rounded.

It appears that these results are obtained when the grip of the rolls on the web is sufficiently strong to cause the paper to be partially stretched and/or compressed around each band with the compound result that the ribs 63 are formed in the paper while the paper composing each of these ribs is stretched or compressed sufficiently thinner than the remainder of the web to accommodate the bands therein without appreciably decreasing the overall dimension of the web transversely of the bands, with the yieldable roll thus acting as a female die and with the bands themselves cooperating with the steel roll to act as male dies in forming the ribs 63. At the same time, with the type as a whole formed as described, it is not weakened by the stretching but in fact is stronger along the reinforcing bands than in the intermediate portions, as is readily demonstrated by tensile tests applied transversely of the bands.

It is possible to carry out the debossing operation to accomplish these results with the web dry, but somewhat more satisfactory results have been obtained if the paper is first moistened sufficiently to swell the fibers and to render the web more pliable during the debossing step, particularly when the web is a hard sized paper of the kraft type and the adhesive for bonding the reinforcing bands to the paper is a pressure moldable material such as a latex-base adhesive of the type noted above, since the moistening and subsequent drying appears to result in a more effective molding of the fibers and resetting in their molded shape.

As stated, in the debossing operation the cross-sectional configuration of the bands is effectively reversed as compared with Fig. 4, with the inner surface 67 (Fig. 9) of the band being more or less rounded while its exposed surface 68 is pressed substantially flat and into substantially unbroken continuity with the adjacent surface area of the paper to leave substantially no void spaces, particularly when a pressure moldable adhesive is employed as described, and also the bands appear to be adhesively secured to substantially the entire inner surface of the ribs or grooves. If a harder adhesive is used which is not readily moldable under pressure there may be small open spaces along the edges of the bands, but if so they will be filled by the glue layer 62 to give an overall even surface. The general appearance and characteristics of the product are improved by subjecting the web to a second debossing operation after it has been dried, the results obtained by this combination of wet and dry debossing being superior to those obtained by either a single wet debossing step or by twice subjecting the reinforced web to the debossing step while it is dry.

Fig. 15 shows somewhat diagrammatically an arrangement of apparatus for carrying out the debossing or embedding operation as discussed above on a web 70 having reinforcing bands 71 bonded thereon as described in connection with Figs. 1 to 7. For example, the web 70 may represent the web 22 of Fig. 7 passing directly from the drum 30. The web 70 is shown as passing between a pair of feed rollers 72 and 73 and under a roller 74 in a tank or vat 75 of water to moisten the paper, and the moistened web then passes over an idler 76 and between a pair of wiper rolls 77 and 78 located above the vat 75 to remove the surplus moisture. Next the web passes around a steel roll 80 having one or more rubber rolls 81 mounted in pressure contact therewith so that the web is subjected to substantial pressure between the steel roll and each of the rubber rolls. These rubber rolls are of a selected hardness such that the desired firm grip is maintained on the web to cause the paper to be stretched and molded as described around each ribbon 71 to form the ribs 82 as each ribbon passes through the nip of the rolls. For example a roll hardness of the order of a durometer reading of 90 to 100 has been found satisfactory with the above noted latex-base adhesive and kraft paper, and in any case the softer roll should be sufficiently harder than the adhesive to cause the desired pressure molding of the reinforcing bands as described.

From the steel roll 80, the web passes around idlers 83 and 84 to a second steel roll or drum 85, and a heat source such as the lamp indicated at 86 may be mounted in position to apply heat to the web for drying the same as it passes in front of the lamp. Also the steel roll 80 and the drum 85 may be heated to effect gradual drying of the excess moisture in the web. Fig. 15 shows the web as being held in contact with drum 85 by means of an endless belt 87 running on rollers 88, and the web may then be conducted as shown by idlers 89 to a further heated drum 90, from which the web is led by means of idlers 91, 92 and 93 to a winding reel indicated diagrammatically at 95. The drums 80, 85 and 90 may be driven in any suitable manner to cause the desired advance of the web, and the rubber rolls 81 may be driven by contact with drum 80 or may be provided with a direct drive if it is found desirable to rotate them at a different peripheral speed from drum 80.

If it is desired to subject the web to a further debossing operation, such as the dry debossing step described above, this may be done by repeating the passage of the web through the apparatus shown in Fig. 15 but without moistening it, or by employing the drum 90 as the pressure applying member in cooperation with a rubber roll such as indicated at 96 in Fig. 15. Thereafter, or in combination with the winding reel, the reinforced web may be slit to the desired widths and gummed by suitable conventional adhesive applying apparatus. For example, it may be gummed by a water moistenable adhesive such as animal glue or other water soluble glue, a pressure-sensitive adhesive material, a chemical-responsive adhesive material or a thermoplastic adhesive if desired, depending upon the purpose and use for which the tape or web is intended. It should also be noted that any of the forms of reinforced tape disclosed herein may also have adhesive applied thereto, or a solvent for moistening the adhesive already thereon, as it is being secured to a carton or other article if desired.

Stay tape formed as described with the embedded reinforcing bands arranged transversely of its length may be used successfully in automatic taping machines and does not tend to be broken or weakened even under the repeated stresses caused by the intermittent high speed feeding action of the feed rolls commonly employed in such machines. Furthermore, the grooves or ribs formed by the debossing operation as described appear to be effectively molded into the paper web and strongly resist spreading or flattening out under even substantially greater stresses transversely of the ribs than are encountered in automatic taping operations. They even resist spreading out under test conditions after the reinforcing bands have been physically removed from the web for purposes of the test, and it accordingly appears that the hard kraft type paper is thus permanently molded by the controlled debossing operation.

One of the advantages of the above embedding or debossing operation is that it readily compensates for a moderate amount of twisting in the reinforcing elements provided such twisting is not sufficient to prevent lateral displacement of the filaments on the web, for example, a twist of the order of three turns per inch of length of the yarn being not objectionable in the debossed product. Thus it is readily possible to practice the invention with the reinforcing bands initially drawn from stationary cones or bobbins without requiring precise control preventing all twisting of the yarn so long as the filaments are maintained in relatively loose relation. Under these conditions, moderate twisting does not objectionably increase the thickness of the yarn or prevent its desired flattening in the debossing or embedding operation, as contrasted with a more highly twisted yarn or cord, including particularly a cord wherein twist is required to hold discontinuous filaments together, and also as contrasted with ribbons formed by weaving or otherwise composed of individually twisted threads. In general, however, preferred results are obtained with minimum twist in the reinforcing elements.

The embedding or debossing operation may be performed as described on a reinforced web formed as shown in Fig. 6 with the reinforcing bands applied thereto in a mesh arrangement. Fig. 13 shows such a product in which the paper web 99 has reinforcing bands 100 and 101 bonded thereto as described in connection with Fig. 6, and these bonds are embedded in the paper to form a meshlike rib structure on the reverse side thereof as indicated at 102. Fig. 13 also shows this reinforced web as having an outer layer 105 of paper, foil or other suitable sheet material bonded to the reinforced side of the web 99 by a layer of adhesive 106, which may desirably be a waterproof material to impart waterproof properties to the laminated product.

Similar results may be obtained by laminating two sheets reinforced as shown in Fig. 8 arranged with the respective reinforcing elements at right angles to each other. Fig. 14 shows such a laminated product wherein the sheet 110 provided with debossed reinforcing elements 111 is bonded by an adhesive layer 112 to a second sheet 113 provided with debossed reinforcing elements 114 arranged at right angles to the elements 111, and with this arrangement, the reinforced surfaces of both sheets 110 and 112 are in sufficiently uniform contact to require only a minimum thickness of adhesive in layer 112. In both of the laminated sheets of Figs. 13 and 14, a portion of the paper between the bands may be punched out as shown in my patent No. 2,610,936, to provide an open mesh type of web which is particularly adapted for uses such as in bags for containing vegetables and the like and which offers material advantages of high strength and economy.

The laminated reinforced paper of Fig. 13 may be produced by first debossing the reinforced web and then laminating the cover layer thereto, or the debossing operation may be performed following or in conjunction with the laminating operation as shown in Fig. 16, in which the reinforced web 99 and the cover layer 105 are illustrated as passing between a steel roll 120 and a rubber roll 121 of the proper hardness as discussed above. When the debossing is carried out in this manner, the cover layer 105 is maintained substantially smooth, since it is adjacent the smoothly surfaced steel roll, while the reinforced web 99 has the reinforcing bands embedded therein in the same manner as described in connection with Fig. 14, it being apparent that this operation is applicable equally to a reinforced web having only a single series of reinforcing bands thereon as shown in Fig. 8 or having crossed reinforcing bands as shown in Fig. 13.

Reinforced sheet material of the character shown in Fig. 13 is useful for the manufacture of products such as shipping tags, labels and the like, either with or without the covering layer 105, and for such uses somewhat thinner or finer yarns may be used satisfactorily as the reinforcing elements, with the spacing between adjacent bands correspondingly reduced. The reinforcing bands may be arranged in mesh fashion for such purposes, or they may all run in the same direction as shown in Fig. 8. Instead of a laminated cover layer, the reinforced surface of the paper web may be provided with a finish coating of plastic or other material providing a smooth surface suitable for printing, writing or the like, and the layer 62 in Fig. 9 may be considered as representing such a finish coating. For such applications the reinforcing bands should comprise relatively fine yarns, for example on the order of 200 to 500 denier. It will also be understood that the embedding or debossing operation of the invention is applicable to tape formed as shown in Fig. 5 with the reinforcing elements extending longitudinally. This form of tape is particularly applicable to uses such as for binder twine or for tying bundles of substantial size, for example bundles of paper bags, without tearing or injuring the material, and since tape for such purposes should be relatively more narrow than stay tape, the reinforcing bands should be relatively closer together, for example one-eighth inch or less apart.

In all of the above described forms of the invention, an exceedingly strong and intimate bond is obtained between the reinforcing elements and the paper web such that the composite product possesses the maximum tensile strength and tear or shear strength represented by the addition of the natural strength of the paper to that of the several reinforcing elements, this being especially so when the reinforcing elements and paper are substantially matched with respect to elastic limit as described to prevent independent rupture thereof. Thus, not only do the reinforcing elements combine to resist tensile or bursting stresses, but also they combine against shear stresses since the bands are firmly and uniformly adhered to the paper and do not slip with respect thereto when subjected to a tearing force. At the same time, the use of adhesive as described to bond the reinforcing bands to the paper only in the areas of contact therebetween materially reduces the required quantity of adhesive for this purpose, particularly as contrasted with other types of reinforced tape wherein reinforcing elements are embedded in an adhesive layer or are secured to the paper by an overall coating of adhesive. It is accordingly practicable to utilize adhesive materials in fabricating the products of the invention which are of higher quality and higher cost than in the other types of tape at a total production cost competitive with such other tapes for the same purposes which utilize asphalt and like cheaper and less satisfactory adhesives.

Reference is made to my co-pending application, Serial No. 527,249, filed August 9, 1955, as a continuation-in-part of this application.

While the products herein described, and the methods and apparatus for carrying these methods into effect, constitute preferred embodiments of the invention, it is to be understood that the invention is not limited to these precise products, methods and forms of apparatus, and that changes may be made in either without departing from the scope of the invention which is defined in the appended claims.

What is claimed is:

1. The method of producing a high strength reinforced paper web which includes the steps of saturating with a pressure moldable adhesive material a plurality of reinforcing elements each comprising a multiplicity of substantially continuous filaments arranged in sufficiently untwisted relation for ready lateral displacement under pressure, applying said saturated elements to one surface of a web of kraft paper in spaced and substantially parallel relation, causing said adhesive to set in bonding relation with said filaments and said web surface, moistening said web, and yieldably supporting the surface of said moistened web opposite said elements while applying pressure to the exposed portions of said elements to spread said elements laterally and to depress said elements into said web while forming said web at least partially around the side edges of said elements.

2. The method of producing a high strength reinforced paper web which includes the steps of saturating with a pressure moldable adhesive material a plurality of reinforcing elements each comprising a multiplicity of substantially continuous filaments arranged in sufficiently untwisted relation for ready lateral displacement under pressure, applying said saturated elements to one surface of a web of kraft paper in spaced and substantially parallel relation, causing said adhesive to set in bonding relation with said filaments and said web surface, moistening said web, yieldably supporting the surface of said moistened web opposite said elements while applying pressure to the exposed portions of said elements to depress said elements into said web, drying said web, and thereafter again yieldably supporting the surface of said web opposite said elements while applying pressure to the surface of said web having said elements thereon to flatten and depress said elements into substantially coplanar relation with the adjacent said web surface while forming ribs on said other web surface to receive said elements therein.

3. The method of producing a high strength reinforced paper lamination which includes the steps of, advancing a paper web, applying adhesive material to a plurality of reinforcing elements each comprising a multiplicity of substantially continuous filaments arranged in sufficiently untwisted relation for ready lateral displacement under pressure, forming said filaments into thin bands extending laterally in the same direction as said web, applying said bands to one surface of said advancing web in spaced and substantially parallel relation, causing said adhesive to set in bonding relation with said filaments and said web surface, laminating a second web to said first named web in covering relation with said bands, applying pressure to said second web, and simultaneously yieldably supporting said first named web to flatten and spread said bands and to depress said bands into said first named web while imparting substantially smooth outer surface characteristics to said second web.

4. The method of producing a high strength reinforced paper web comprising the steps of causing a paper web to travel around a cylindrically curved surface, saturating with adhesive a plurality of reinforcing elements each formed of a multiplicity of substantially continuous filaments arranged in sufficiently untwisted relation for ready lateral displacement under pressure, removing excessive adhesive from said bands, spreading said filaments laterally in a direction generally parallel with the axis of curvature of said curved surface to flatten each said band, guiding said flattened bands to said web in generally tangential relation with said curved surface to maintain tension therein, applying said bands to said web on said curved surface and in spaced and generally parallel relation with each other, and pressing said bands into firm adhesive engagement with said web.

5. The method of producing a high strength reinforced paper product which includes the steps of causing a paper web to travel around a cylindrically curved surface, saturating with a heat setting adhesive a plurality of reinforcing elements each comprising a multiplicity of substantially continuous filaments arranged in sufficiently untwisted relation for ready lateral displacement under pressure, guiding said saturated reinforcing elements to said web in generally tangential relation with said curved surface to maintain tension therein, applying said reinforcing elements to said web on said curved surface and in spaced and generally parallel relation with each other while maintaining said tension therein to effect close bonding of said reinforcing elements to said web, and applying heat to said web while continuing the travel of said web around said curved surface to set said adhesive with said reinforcing elements in intimate contact with said web.

6. The method of producing a high strength reinforced paper product which includes the steps of continuously advancing a web of kraft paper having on one surface thereof a plurality of elongate reinforcing elements each comprising a multiplicity of substantially continuous filaments arranged in sufficiently untwisted relation for ready lateral displacement under pressure and a pressure moldable adhesive substantially saturating said elements to secure said filaments therein together in a compact band and to secure said band to said web surface, moistening said web, supporting the surface of said moistened web opposite said bands with firm yielding pressure, simultaneously applying firm and unyielding pressure to the reinforced surface of said web to flatten and depress said bands into substantially coplanar relation with the surrounding surface of said web while forming ribs on the other said web surface to receive said bands, and then drying said web to set the same with said bands embedded therein.

7. The method of producing a high strength reinforced paper product which includes the steps of continuously advancing a web of kraft paper having on one surface thereof a plurality of elongate reinforcing elements each comprising a multiplicity of substantially continuous filaments arranged in sufficiently untwisted relation for ready lateral displacement under pressure and a pressure moldable adhesive substantially saturating said elements to secure said filaments therein together in a compact band and to secure said band to said web surface, moistening said web, supporting the surface of said moistened web opposite said reinforcing elements with firm yielding pressure while applying firm unyielding pressure to the exposed portions of said elements to depress said elements into said web, drying said web, then again supporting the surface of said web opposite said bands with firm yielding pressure, and simultaneously applying firm and unyielding pressure to the reinforced surface of said web to flatten and depress said bands into substantially coplanar relation with the surrounding surface of said web while forming ribs on the other said web surface to receive said bands.

8. A high strength reinforced paper product comprising a first web of paper, a plurality of elongate reinforcing elements overlying one surface of said web in spaced relation, each of said reinforcing elements consisting essentially of a multiplicity of substantially continuous filaments arranged in sufficiently untwisted relation for ready lateral displacement under pressure and with said filaments lying in a plurality of levels to form a thin band equal in thickness to the combined thickness of a plurality of said filaments, a pressure moldable adhesive material substantially saturating each said band to secure said band to said web surface while securing said levels of filaments together in compact form, each said band being of substantially greater average width than the maximum thickness thereof to provide a corresponding wide area for intimate adhesive contact between adhesive saturated band and said web surface, a second web overlying said reinforcing elements and adhered to said first paper web, said bands being in embedded relation with said first web and with the surfaces thereof adjacent said second web substantially flat and coplanar with the interface of said webs, said first web having ribbed portions therein receiving said bands and projecting on the outer surface thereof, and said second web having its outer surface substantially smooth.

9. A laminated high strength reinforced paper product comprising a first web of paper, a plurality of elongate reinforcing elements overlying one surface of said web in spaced and substantially parallel relation and formed of a multiplicity of substantially continuous filaments arranged in sufficiently untwisted relation for ready lateral displacement under pressure and a pressure moldable adhesive material substantially saturating each said element to secure said filaments therein together in a compact band and to secure said band to said web surface, said bands being in embedded relation with said web and with the surfaces thereof substantially flat and coplanar with the surface of said web between adjacent said bands, a second web of paper having secured to and embedded in one surface thereof a similar plurality of elongate reinforcing elements arranged in spaced and substantially parallel relation, each of said paper webs having ribbed portions in the surface thereof opposite said reinforcing elements for receiving said reinforcing elements in embedded relation therewith, said webs being arranged with said reinforced surfaces thereof in face to face relation and with said reinforcing elements in the respective said webs at substantially right angles to each other, and a layer of adhesive intermediate said webs and bonding said webs together.

10. A laminated high strength reinforced paper product comprising a first paper web, a plurality of elongate reinforcing elements overlying one surface of said web in spaced relation, each of said reinforcing elements consisting essentially of a multiplicity of substantially continuous filaments arranged in sufficiently untwisted relation for ready lateral displacement under pressure and with said filaments lying in a plurality of levels to form a thin band equal in thickness to the combined thickness of a plurality of said filaments, adhesive material substantially saturating each said band to secure said band to said web surface while securing said levels of filaments together in compact form, each said band being of substantially greater average width than the maximum thickness thereof to provide a corresponding wide area for intimate adhesive contact between said adhesive saturated band and said web surface, a second paper web overlying said reinforced surface of said first web, and a layer of adhesive material on the portions of said reinforced surface of said first web between said bands adhering said webs together while maintaining the outer surfaces of both said webs substantially smooth and providing substantially uniform thickness throughout the resulting laminated product.

11. A high strength reinforced paper product comprising a first web of paper, a plurality of elongate reinforcing elements overlying one surface of said web in spaced relation, each of said reinforcing elements consisting essentially of a multiplicity of substantially continuous filaments arranged for lateral displacement under pressure and with said filaments lying in a plurality of levels to form a thin band equal in thickness to the combined thickness of a plurality of said filaments, a pressure moldable adhesive material substantially saturating each said band to secure said band to said web surface while securing said levels of filaments together in compact form, each said band being of substantially greater average width than the maximum thickness thereof to provide a corresponding wide area for intimate adhesive contact between adhesive saturated band and said web surface, a second web overlying said reinforcing elements and adhered to said first paper web, said bands being in imbedded relation with said first web and with the surfaces thereof adjacent said second web substantially flat and coplanar with the interface of said webs, said first web having ribbed portions therein receiving said bands and projecting on the outer surface thereof, and said second web having its outer surface substantially smooth.

12. A high strength laminated reinforced paper product comprising a first web of paper, a plurality of elongate reinforcing elements overlying one surface of said web in spaced and substantially parallel relation and formed of a multiplicity of substantially continuous filaments arranged for ready lateral displacement under pressure and a pressure moldable adhesive material substantially saturating each said element to secure said filaments therein together in a compact band and to secure said band to said web surface, said bands being in imbedded relation with said web and with the surfaces thereof substantially flat and coplanar with the surface of said web between adjacent said bands, a second web of paper having secured to and imbedded in one surface thereof a similar plurality of elongate reinforcing elements arranged in spaced and substantially parallel relation, each of said paper webs having ribbed portions in the surface thereof opposite said reinforcing elements for receiving said reinforcing elements in imbedded relation therewith, said webs being arranged with said reinforced surfaces thereof in face-to-face relation and with said reinforcing elements in the respective said webs at substantially right angles to each other, and a layer of adhesive intermediate said webs and bonding said webs together.

13. A high strength laminated reinforced paper product comprising a paper web, a plurality of elongate reinforcing elements overlying one surface of said web in spaced and substantially parallel relation, a second plurality of elongate reinforcing elements overlying the same said surface of said web in spaced and substantially parallel relation and with said second plurality of reinforcing elements arranged generally transversely of said first plurality of reinforcing elements, each of said reinforcing elements consisting essentially of a multiplicity of fine substantially continuous organic synthetic filaments arranged in close side-by-side and overlying relation to form a thin band, adhesive material substantially saturating each said band and securing said filaments therein to each other and to said web surfaces in compact form, each said band being of substantially greater width than the maximum thickness thereof to provide a correspondingly wide area for intimate adhesive contact between said adhesive-saturated band and said web surface, said bands being in imbedded relation with said web and having the exposed surfaces thereof substantially flat and coplanar with the surface of said web between adjacent bands, and said web having rib portions therein receiving said bands and projecting on the surface thereof opposite said bands.

References Cited in the file of this patent

UNITED STATES PATENTS

| | | |
|---|---|---|
| 855,322 | Maccallum | May 28, 1907 |
| 977,054 | Trog | Nov. 29, 1910 |
| 1,460,392 | Schenkelberger | July 3, 1923 |
| 1,651,039 | Overbeke | Nov. 29, 1927 |
| 1,861,044 | Ballard | May 31, 1932 |
| 1,866,513 | Ballard | July 5, 1932 |
| 1,872,316 | Meeker | Aug. 16, 1932 |
| 2,273,554 | Bannon | Feb. 17, 1942 |
| 2,561,781 | Bruce | July 24, 1951 |
| 2,610,936 | Carlson | Sept. 16, 1952 |